May 1, 1928.

A. O. ABBOTT, JR 1,668,037

MANIFOLD SYSTEM FOR VULCANIZING

Filed Sept. 20, 1922     2 Sheets-Sheet 1

INVENTOR.
ADRIAN O. ABBOTT, JR.,

BY Ernest Hopkinson

HIS ATTORNEY.

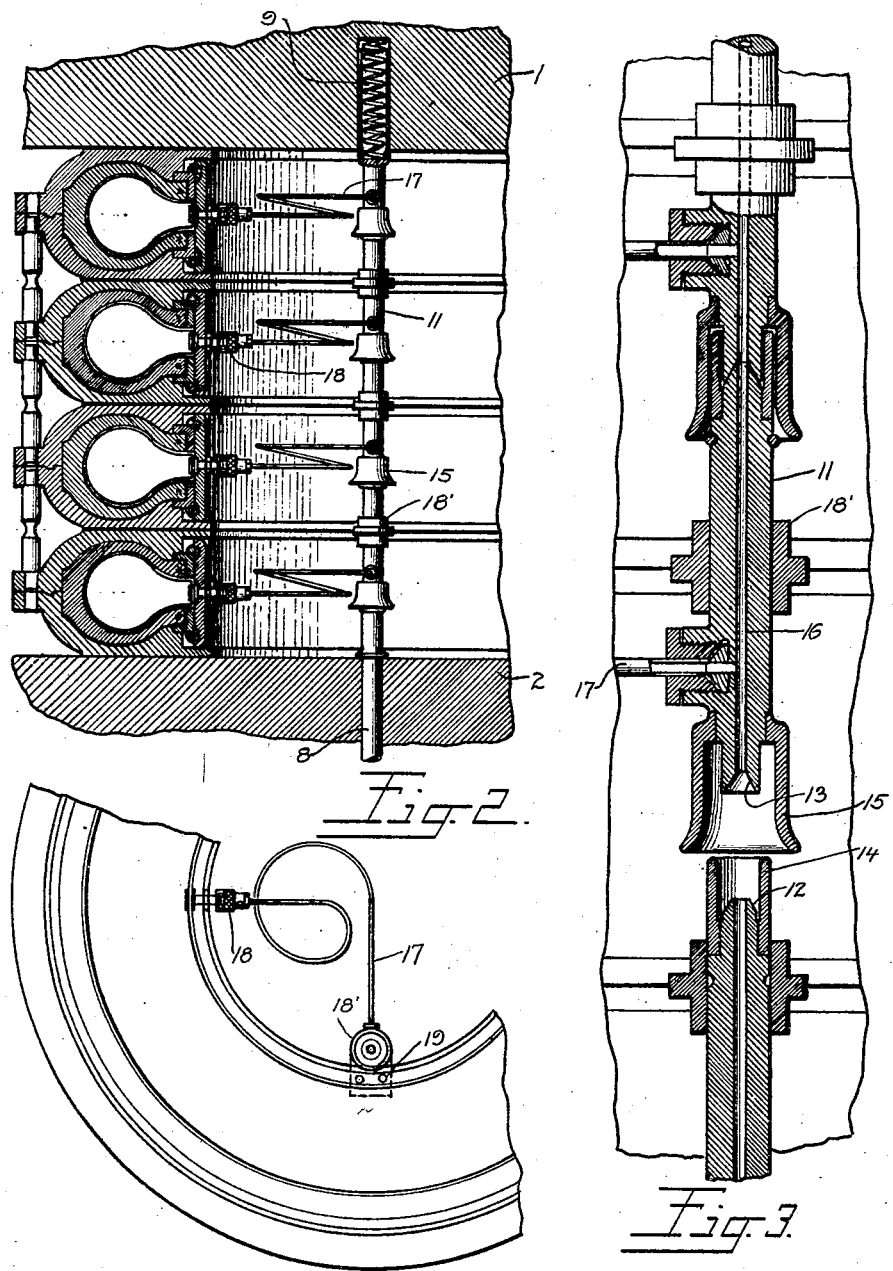

Patented May 1, 1928.

1,668,037

UNITED STATES PATENT OFFICE.

ADRIAN O. ABBOTT, JR., OF DETROIT, MICHIGAN, ASSIGNOR TO MORGAN & WRIGHT, A CORPORATION OF MICHIGAN.

MANIFOLD SYSTEM FOR VULCANIZING.

Application filed September 20, 1922. Serial No. 589,450.

This invention relates to the manufacture of hollow rubber articles and in particular pneumatic tire casings.

For the vulcanization of casings, it has been found desirable for some purposes to apply to their interiors during cure a fluid under pressure supplied through a header with branches leading to each of the molds. Generally, this practice is referred to as the "manifold process". As heretofore constructed, the manifolds have been found objectionable. In some forms they are large and cumbersome, or made up of parts that have to be screwed together, or generally do not permit the establishment of fluid communication between an outside source of supply and the interior of the tires as readily or with as great facility as is desirable.

The present invention aims to overcome the objections inhering in previous constructions and, more specifically, to provide a construction of manifold that may be coupled together easily and quickly so as not to hinder rapid loading of a press.

With the illustrated embodiment in mind and without intention to limit its scope more than is required by the prior art, the invention may be briefly described as consisting of a header or main supply pipe composed of sections with interengageable seats on their ends that may be joined together so as to constitute a guiding passage for fluid under pressure by the necessary operation of closing the press upon a stack of molds therein. Branch connections are, of course, provided between the header and the interior of each of the molds.

The preferred form of the invention is illustrated in the accompanying drawings in which:—

Fig. 2 is a fragmentary section of a shaping press; and

Figs. 3 and 4 are fragmentary sections and elevations showing leading new features of construction of the manifold.

Figure 1:
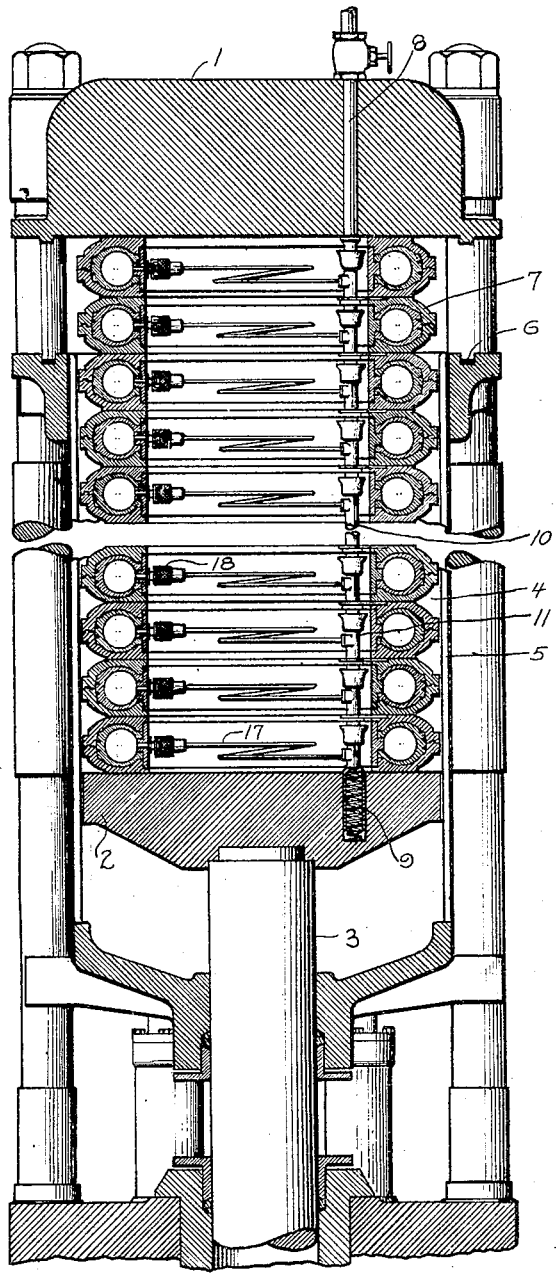
Fig. 1 is a sectional elevation of the assembled manifold system showing the essential parts of the vulcanizer holding a stack of molds.

In Fig. 1 of the drawings, the invention is shown applied to a French press type of vulcanizer having co-operating upper and lower press members 1 and 2, the latter being shiftable by a ram 3 in a heating chamber 4 constituted by a cylindrical shell 5 which is adapted to be sealed, as indicated at 6, against the upper press member 1, thereby to constitute a closed chamber for subjecting a batch of molds 7 to a curing treatment. The invention may be employed with any type of vulcanizer although that illustrated and described is in practically exclusive use for the manufacture of pneumatic tires.

A valve controlled supply pipe 8 is suitably mounted in the upper press member 1 and a spring-pressed abutment 9 is mounted in the lower press member 2, in alignment with the pipe 8. Intermediately of these two parts, a header, indicated generally at 10, is adapted to be positioned. This header 10 is preferably constructed of a plurality of sections 11, each approximating in length the axial thickness of a mold. Each of the sections 11, as shown in Fig. 3, is provided with ground (and preferably conical) seats 12 and 13 at its opposite ends and with co-operating pilots or guiding devices 14 and 15, which align the sections 11 in their assemblage one upon another as well as protect the ground faces of the seats from injury. Each of the sections 11 is bored out to form a passageway 16 through which fluid may be passed to a branch or conduit 17, preferably of flexible material, having a releasable or detachable connection 18 with a mold.

While the sections 11 may be free and independent of the molds and may be steadied in alignment by the connections 17, I prefer to employ guiding brackets 18' for slidably supporting each of the sections 11, these brackets being secured either loosely between contiguous molds or loosely dowelled, as indicated at 19, to one of the halves of each of the molds.

In Fig. 2 of the drawings, the same manifold system is indicated as applied to a shaping press, i. e., a type of apparatus employing two press members, 1 and 2, to clamp the molds together, but having no enclosing shell, such as shown at 5 in Fig. 1 of the drawings, for confining steam in a closed chamber about the molds. Obviously, the invention is applicable to this type of tire treating apparatus as well as a vulcanizer and such a use of my manifold system is contemplated.

In operation, assuming at the start that the vulcanizer (or press) is open and the lower press member 2 in a raised position at the top of the heated chamber, a mold is slid into the press and the lowermost section 11ª positioned upon the yieldable abutment 9, which may be provided with a socket or a projecting pin to hold the same against lateral shift, its branch 17 being then joined to the mold by means of the releasable connection 18, which may be an automatically operating valve of a thermostatic or other type if desired. A second mold is then stacked upon the first and another of the sections 11 and branches 17 connected up as before. Likewise, successive molds are stacked and their manifold connections completed. When the press is fully loaded, the lower press member 2 is moved toward the upper press member 1 and the molds clamped together. In this movement, the interengageable faces 12 and 13 of the respective sections 11 are guided together by the devices 14—15, and ultimately sealed so as to constitute the header a main for supplying fluid (gaseous or liquid) from the outside source of supply 8 to the interior of each of the molds through the several branches 17. Finally, the shell or jacket 5 is closed against the upper press member 1, if the molds are to be vulcanized, and a heated medium supplied to the chamber 4. At any convenient time after the molds have been clamped together, fluid is passed through the pipe 8.

While I prefer to employ a simple type of construction for the branches 17, such as flexible copper tubing, any other construction may be employed that permits of movement in the branches 17 and limited endwise movement of the sections 11 and sealingly coupling them together by operation of the press members.

It will be obvious that many changes may be made in the details of the construction but all such are comprehended as are within the scope of the annnexed claims to which reference should be made.

Having thus described my invention, what I claim and desire to protect by Letters Patent is:

1. An apparatus including press members for subjecting molds to treatment in combination with, means for supplying fluid to the interior of the molds, including a header composed of sections with inter-engageable ends, means adapted to be supported by the molds for slidably supporting each of the sections, branch connections between each of the sections and the molds for establishing communication between the sections and the interior of the molds, and means co-operating with the header and the press members for communicatively connecting up the several sections thereof.

2. An apparatus including press members for subjecting molds to treatment, in combination with, means for supplying fluid to the interior of the molds, including a header composed of sections with inter-fitting ends, means supported by one press member and co-operating with the other press member for sealing the sections together to form a header thereof, and branch connections between the sections of the header and the molds.

3. Vulcanizing apparatus comprising, a plurality of molds, and means associated with each of said molds for conducting pressure fluid into an article contained therein, each of said several means including a plug-and-socket coupling device, said coupling devices being adapted to be connected loosely in series as the molds are juxtaposed in the apparatus, in combination with co-operating press members for clamping the molds together, and means associated with the press members for simultaneously clamping the several coupling devices together to constitute them a trunk conduit.

4. An apparatus including press members for subjecting molds to treatment, in combination with, means for supplying fluid to the interior of the molds, including a header composed of sections with inter-engageable ends, means supported by the molds for sustaining each of the sections of the header, branch connections between the sections and the molds for establishing communication between the sections and the interior of the molds, and means associated with the press members for simultaneously coupling the several sections together to constitute them a trunk conduit in communication with an outside source of fluid pressure.

5. A sectional manifold for use in a vulcanizing press comprising a series of loosely assembled sctions adapted to rest on one member of the press, and a yielding member adapted to contact with the other member of the press and to force the sections together into fluid tight relation upon closing of the press.

6. A sectional manifold for use in a vulcanizing press comprising a series of sections adapted to rest on one member of the press and having interfitting plug and socket connections presenting fluid tight joints when pressed together, means adapted to connect the several sections with articles in the heater, and a yielding member adapted to contact with the other member of the press and to force the sections together into fluid tight relation upon closing of the press.

Signed at Detroit, county of Wayne, and State of Michigan, this 12th day of September, 1922.

ADRIAN O. ABBOTT, Jr.